United States Patent [19]

Curlett et al.

[11] Patent Number: 4,676,563

[45] Date of Patent: Jun. 30, 1987

[54] APPARATUS FOR COUPLING MULTI-CONDUIT DRILL PIPES

[75] Inventors: Harry B. Curlett; George M. Raulins, both of Farmers Branch, Tex.

[73] Assignee: Innotech Energy Corporation, Farmers Branch, Tex.

[21] Appl. No.: 730,428

[22] Filed: May 6, 1985

[51] Int. Cl.⁴ ............................................ H01R 15/00
[52] U.S. Cl. ................................ 439/194; 285/133.2; 285/333; 285/910; 285/913; 439/195
[58] Field of Search ............... 339/15, 16 R, 16 C, 339/16 RC; 175/320; 285/910, 913, 133.2, 330, 333

[56] References Cited

U.S. PATENT DOCUMENTS

| | | | |
|---|---|---|---|
| 1,054,812 | 3/1913 | Zierath | 285/913 |
| 1,521,482 | 12/1924 | Steele | 285/333 |
| 1,781,091 | 11/1930 | Wilson | 285/333 |
| 2,054,859 | 9/1936 | Kitching | 285/133.2 |
| 2,232,360 | 2/1941 | Barnett | 255/1 |
| 2,307,275 | 1/1943 | Johnson | 285/330 |
| 2,748,358 | 5/1956 | Johnston | 339/16 |
| 2,750,569 | 6/1956 | Moon | 339/16 R |
| 2,775,471 | 12/1956 | Douglas | 285/910 |
| 2,795,397 | 6/1957 | Hull et al. | 255/28 |
| 3,844,345 | 10/1974 | Evans et al. | 166/72 |
| 4,569,392 | 2/1986 | Peterman | 166/242 |

FOREIGN PATENT DOCUMENTS 1135396 8/1962 Fed. Rep. of Germany ...... 175/320

OTHER PUBLICATIONS

FMC Brochure, 6/82.
"Hammer Pipe", Brochure, Drill Systems Inc.
Con—Cor Equipment Brochure, Walker—Deer Man. Co. Inc.

*Primary Examiner*—John McQuade
*Attorney, Agent, or Firm*—Jerry W. Mills; Roger N. Chauza

[57] ABSTRACT

Apparatus for coupling multi-conduit drill pipes to maintain arcuate registry between connected pipes, and for transferring the drive torque of one drill pipe to the next drill pipe. One end of one drill pipe (50) includes drive lugs (100) matable with corresponding drive recesses (102) in the end of the next drill pipe (52). An index lug (104) in the drill pipe end, different that the drive lugs (100), is matable with a corresponding index recess (106) in another pipe end ot maintain arcuate registry of the coupled pipes and thus longitudinal alignment of the respective conduits (30) throughout the drill string. An internally threaded coupling collar (84) with different thread pitches at each end thereof is threadable onto the joined lug and recess mated drill pipe ends to hold the pipes mated. The joined pipe ends respectively include external threads (88, 90) of pitches corresponding to that of the coupling collar (84) so that a differential thread action draws the pipes together. A seal (86) is provided between the pipe ends so that when compressed by rotation of the coupling collar (84) each conduit (30, 62) is sealed from adjacent conduits.

20 Claims, 26 Drawing Figures

APPARATUS FOR COUPLING MULTI-CONDUIT DRILL PIPES

RELATED APPLICATION

Drill Pipes And Casings Utilizing Multi-Conduit Tubulars, by Harry B. Curlett, filed herewith, Ser. No. 730,831.

TECHNICAL FIELD OF THE INVENTION

The present invention relates in general to well drilling operations, and more particularly, relates to apparatus for coupling multi-conduit drill pipes to maintain an arcuate registry between connected pipes, and for transferring the drive torque of one drill pipe to the other.

BACKGROUND OF THE INVENTION

Basic well drilling operations have remained unchanged over the years insofar that a number of connected drill pipes, forming a drill string, are rotated to turn a drill bit and abrade the earth formation. During drilling, it is necessary to measure various drilling parameters such as drilling formation, inclination, temperature, PH and the like. Because the drill string rotates, and in many cases thousands of feet below the earth's surface, gaining instantaneous downhole information has been a constant problem.

For example, the most efficient drilling operation occurs when the characteristics of the formation are known to the drilling operator. For different types of formations, such as rocks, soil or fluids and gases, it may be desirable to alter the surface operations to effectively deal with the type of formation in which the drill bit is presently encountering. Traditionally, the formation chips eroded by the drill bit are carried uphole in the annulus around the drill string by fluids pumped downwardly through the drill pipe. The inspection of these chips, however, is unreliable information of formation presently being drilled, as it may take a substantial period of time for the chips the ascend to the surface.

It is known in the art, i.e., U.S. Pat. No. 3,419,092, by Elenburg, that a dual passage drill pipe, in the nature of inner and outer concentric pipes, can be employed to pump aerated drilling fluid down one conduit to decrease the hydrostatic head at the drill bit and thereby accelerate the velocity by which the cuttings are moved upwardly to the surface in the other pipe conduit. In this manner, the cutting chips which represent the type of formation being drilled arrive at the surface more quickly, in which event the drilling operations can be modified accordingly. While fluid commutation to the various concentric conduits of the Elenburg-type drill pipe is relatively uncomplicated, the number of such conduits which can be employed is limited by practical considerations of the drill pipe construction.

In U.S. Pat. No. 2,951,680 by Camp et al., it is recognized that a non-concentric multi-conduit drill pipe may be employed to increase the number of conduits. However, to accommodate fluid commutation, the fluid passage transition from the conduits to the drill pipe end is convoluted into conventional concentric circular passages. As a result, commutation of different fluids into the respective conduits of the Camp et al. drill pipe was provided at the expense of complicating the manufacturability of the pipe, and thus making it costly.

Those skilled in the art have thus recognized the advantage of using multi-conduit drill pipes, but such pipes have not met with widespread success for a number of reasons. One drawback encountered in connecting such pipes together is the manner in which the conduits of one pipe are sealed to the conduits of another pipe. Conventional sealing arrangements include "O" rings or chevron seal rings (U.S. Pat. No. 2,951,680) or traditional packing (U.S. Pat. No. 3,077,358). Because of the type of seal used and the manner in which such seals have been used, the fluid pressure which the seals can withstand is generally under 7,500 p.s.i. differential.

It is apparent, therefore, that there is a need for a high-pressure multi-conduit drill pipe in which the number of conduits is not limited, nor is the structure or fabrication of the pipe unduly complicated or costly.

Moreover, there is an urgent need to monitor downhole drilling operations, instantaneously transmit the results thereof uphole, and combine the transmission medium with the drill pipe in such a manner that the drill pipe fluid carrying capability is not severely compromised.

It has been heretofore proposed to employ the central bore of the drill pipe as a chamber in which an electrical conductor is situated. Exemplary of such practice is that disclosed in U.S. Pat. Nos. 2,795,397 and 3,904,840. According to this practice, however, the conductor insulation is subjected to the drill fluid, or expensive shielding must be used.

An attendant problem with the use of electrical conductors in the fluid-carrying bore is the isolation from the fluids of the electrical connections which connect lengths of conductors together. Elaborate and unusual techniques have been resorted to in order to circumvent this problem. To further compound the problem, the connection of conductors from one drill pipe to another is exacerbated in those types of pipes which require one section to be rotatably screwed into the other. In U.S. Pat. No. 2,748,358, this concern is dealt with by leaving ample cable length so that it may be twisted along with the pipe. In other instances, i.e., U.S. Pat. No. 3,879,097, the electrical cable is carried within the central bore along a majority of its length, except at the ends thereof where the cable is routed through the pipe sidewall to ring shaped contacts on the pipe ends. The number of conductors is obviously limited when resort is had to this technique.

Exemplary of prior provisions for connecting together a plurality of conductors at the pipe ends is that disclosed in U.S. Pat. No. 2,750,569. In this patent, the electrical cable is routed through the fluid carrying bore. This leaves the cable, as well as the connector, susceptible to the corrosive effects of the drill fluid.

Disclosed in a product brochure of FMC Corporation, P.O. Box 3091, Houston, Tex., dated 6/82 is a single conduit drill pipe drivingly connected by antirotation lugs to another pipe, and coupled together by a collar with differential thread action. No provisions are made, however, for maintaining a desired arcuate alignment between coupled drill pipes.

Further concerns in the well drilling art which contribute to the overall expense incurred relate to the composition of the drilling "mud". The mud must be periodically adjusted with different materials and chemicals to effectively change its density, viscosity or other properties. This change can only be accomplished gradually as the mud circulates from the bit area upwardly through surface equipment. In some cases, such as an imminent blow out, the density of the mud must be altered very quickly to prevent such an occurrence. As a consequence, many blow outs cannot be averted with known techniques. A need has thus arisen for a drill string construction which allows the prompt altering of drill mud pressure to control blow outs and to otherwise enhance drilling.

SUMMARY OF THE INVENTION

In accordance with the invention, there is provided apparatus for coupling a first multi-conduit drill pipe to a second multi-conduit drill pipe to form a drill string.

In accordance with a primary feature, therefore, the ends of drill pipes to be coupled include respectively drill lugs and corresponding recesses for transferring the drive torque of the one drill pipe to the next, and in addition, include an index lug and corresponding recess for maintaining a particular arcuate alignment between pipes. The index lug on the end of one drill pipe and the index recess on the end of the next pipe are positioned so as to maintain a longitudinal registry of the conduits throughout the drill string.

In accordance with a further aspect of the invention, the drill pipes are joined together with the seal therebetween by a threaded coupling collar with uniform diameter internal threads at one end thereof and uniform diameter internal threads at the other end thereof, but each such coupling collar end having a different diameter and thread pitch. Each end of a drill pipe section includes threads with diameters and pitches corresponding to that of the coupling collar. This aspect enables the drill pipes to be initially aligned by the index lug and recess and then completely drawn together by a differential thread action which compressively squeezes the seal in sealing engagement between the joined pipes.

BRIEF DESCRIPTION OF THE DRAWINGS

For a more detailed description of the construction and operation of the present invention, reference is now made to the following description taken in conjunction with the accompanying drawings, in which:

FIG. 2 is a side elevational view of a portion of two drill pipes coupled together, and partially cross-sectioned to illustrate thread engagement between the pipes and the coupling collar;

FIG. 3a is a cross-sectional view of the multi-conduit drill pipe, taken along line 3—3 of FIG. 2;

FIG. 3b illustrates a cross-sectional view of an alternative embodiment of the multi-conduit drill pipe illustrating circular peripheral conduits peripherally located about the central conduit;

FIG. 3c is a cross-sectional view of yet another embodiment of the drill pipe illustrating an outer pipe, an inner pipe forming a central conduit, and a plurality of other pipes forming conduits peripherally about the inner central pipe;

FIG. 3d is a cross-sectional view of still another embodiment of the multi-conduit drill pipe illustrating a nest of individual conduits occupying one conduit of the drill pipe of FIG. 3a;

FIG. 4 is a cross-sectional view of coupled multi-conduit drill pipes, taken through the coupling collar at line 4—4 of FIG. 2;

DETAILED DESCRIPTION OF THE INVENTION

Figure 1:
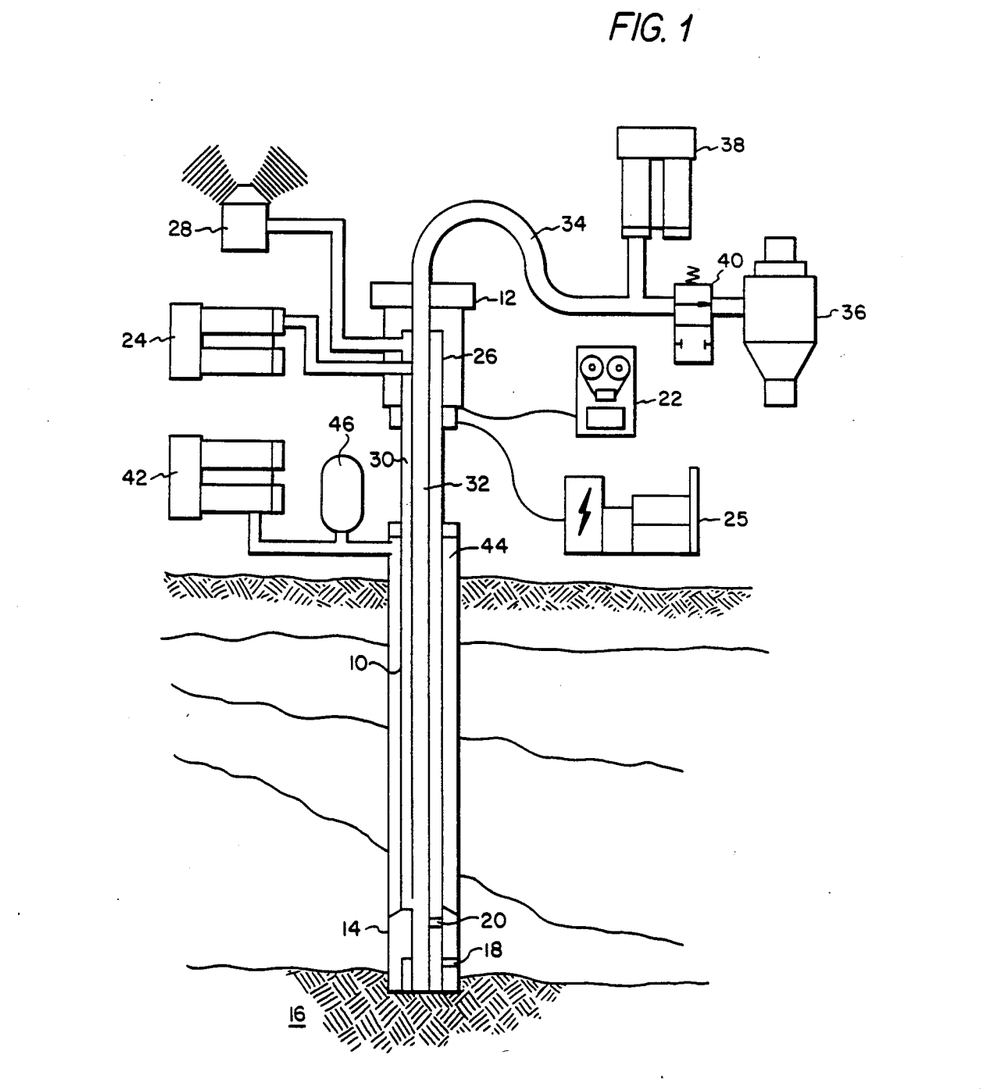
FIG. 1 illustrates in a general manner the up-hole and downhole equipment employed to carry out the various aspects and features of the invention.

GENERAL OVERVIEW Referring now to the figures, there is shown in FIG. 1 the general aspects of the method and apparatus according to the invention. As shown, the invention includes the multi-conduit drill pipe generally designated by the reference character 10 and is driven by the multi-fluid goose-neck swivel 12. Drill bit 14 may be of the many varieties available for eroding the subterranean formation 16 to bore a well.

Various downhole sensors, such as temperature sensor 18 or PH sensor 20 may be employed within the drill bit 14 to gather downhole data and transmit the same to surface monitor equipment 22 through drill pipe wires (not shown in FIG. 1). An electrical power source 25 may also be provided to supply power to drill bit sensors and control of downhole electrical tools, as needed.

A liquid pump 24 supplies high or low pressure fluid to a fluid commutator 26 in the goose-neck swivel. Other similar pumps may also be utilized so that both a low and a high pressure fluid can be pumped downhole to provide improved drilling techniques not heretofore achievable. In a similar manner, a compressor 28 supplies a gas, such as nitrogen, to the fluid commutator 26 for distribution therein to desired conduits 30 of the drill pipe. When the central conduit 32 of the drill pipe is utilized as the channel through which the formation chips are carried in liquid or gas upwardly, such chips are carried by the goose-neck hose 34 to a cyclone separator 36 which is effective to separate the chips from the returned drilling fluid. Liquid pump 38 is also connected to the goose-neck hose 34 to pump fluid from a source (not shown) downwardly through the central conduit 32 to drill or alternatively to counteract any undesired fluid flow in such conduit due to a blow out in the well. Pump 38 may alternatively be used to pump cement or another sealing material downhole to seal the well. A valve 40 is automatically closed when pump 38 is activated so that the pumped material does not enter the separator 36.

Depending upon the method of drilling desired, kill line pump 42 is provided to pump drill fluid down the annulus 44 of the well. An annular accumulator 46 maintains a desired pressure on the annular fluid in the well.

From the foregoing, it is evident that the invention provides various options and alternatives to use in optimizing the drilling operation based upon the existing conditions. From the discussion which follows, it will become even more evident that the present invention provides an advance in the well drilling art not heretofore recognized.

MULTI-CONDUIT DRILL PIPE

Figures 2, 3A, 3B, 3C, 3D, 4:
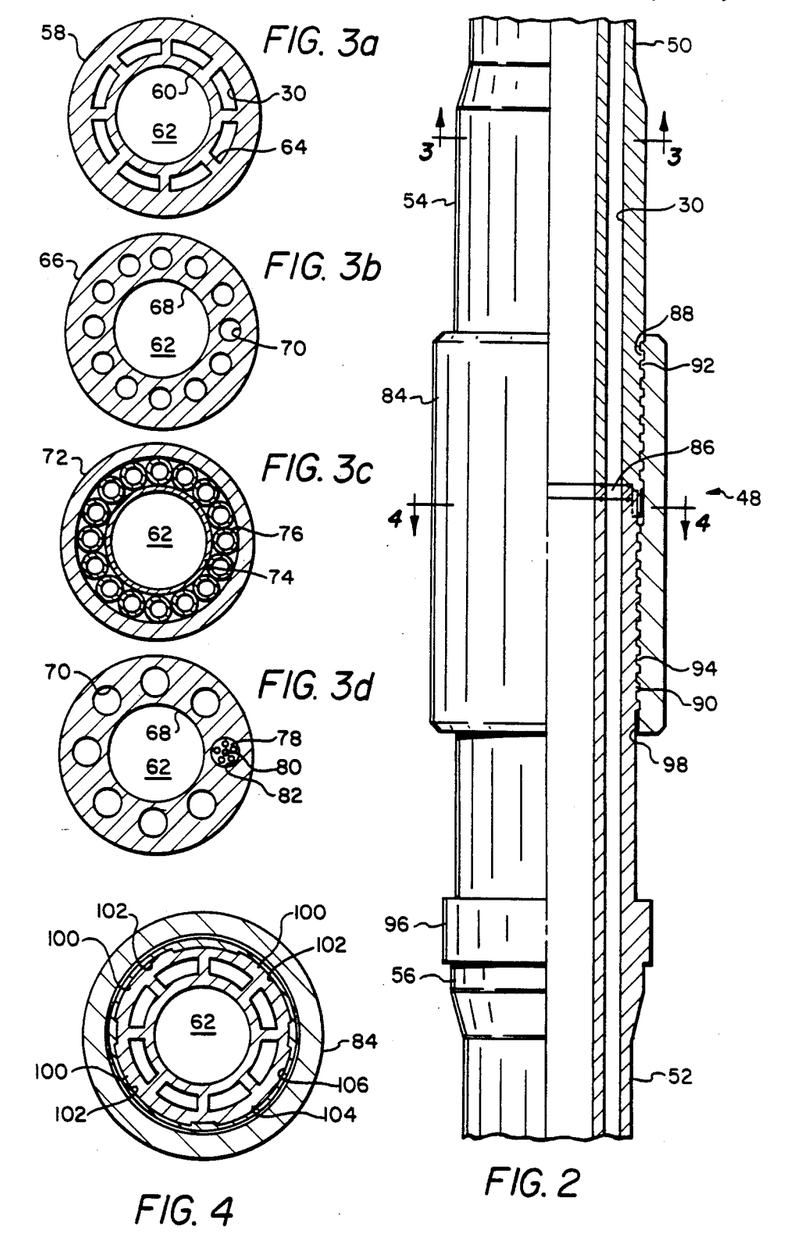

With reference now to FIG. 2 there is shown a coupled section of drill pipe, forming a part of the drill string, and specifically the means by which end sections of the drill pipe are joined. Shown in FIG. 2 is the aspect of the drill pipe wherein a plurality of conduits, one shown as reference character 30, are uniform throughout the drill pipe and thus uniform across the tool joint 48 from one pipe 50 to another pipe 52 joined thereto. Each such conduit 30 is rectilinear in nature, despite the fact that the upset sections 54 and 56 of the drill pipes shown in FIG. 2 are somewhat larger in diameter to satisfy strength and sealing considerations.

The multi-conduit drill pipe 50 is more clearly shown by the cross-sectional view of FIG. 3a. It is of great practical importance from the standpoint of versatility to provide many conduits in the drill pipe, all of which are rectilinear throughout the pipe and which can be interjoined to supply any desired number of liquids or gases downhole, the liquids or gases being isolated from one another and therefore capable of being supplied at different pressures and quantities. To that end, the invention in its preferred form is comprised of a drill pipe having an outer sidewall 58 and an inner concentric sidewall 60 forming a central conduit 62 through which, by choice and not by necessity, a majority of fluid is pumped. Located between the inner sidewall 60 and outer sidewall 58, the various longitudinal conduits 30 are defined in the nature of a longitudinal annular channel between the inner and outer sidewalls, divided into the independent conduits 30 by radial dividers 64. Each conduit 30 thus has the general cross-sectional configuration of a trapezoid with the arcuate sides defining the parallel sides.

With this construction, it is highly advantageous to fabricate the described drill pipes by extrusion methods out of aluminum with steel upsets, or entirely of high grade steel. Conduit configurations other than that shown in FIG. 3a may, or course, be used to satisfy particular needs. For example, FIG. 3b illustrates an alternative form of the multi-conduit drill pipe with an outer and inner sidewall 66 and 68, the inner sidewall 68 again defining a central conduit 62. In this form, however, a series of cross-sectionally circular conduits 70 are spaced equal distances peripherally about the central conduit 62 between the inner 68 and outer 66 sidewalls. This form of the drill pipe may advantageously be constructed by standing the pipe stock on end and drilling each conduit vertically.

FIG. 3c shows yet another version of the multi-conduit drill pipe similar to FIG. 3b, except constructed of a large pipe 72, the exterior wall thereof forming the outer sidewall, and a smaller pipe 74 forming the central conduit 62. Between the larger and smaller pipes, 72 and 74, a plurality of other even smaller diameter pipes 76 are peripherally located. Each pipe of the FIG. 3c is welded to an adjacent pipe at the drill pipe ends.

FIG. 3d depicts a modified version of the drill pipe of FIG. 3b. In the drill pipe having perpheral circular conduits 70, there is inserted a tubular multichannel insert 78, and fixed therein such as by welding. The insert 78 includes a central axial channel 80 with a number of peripheral channels 82, all of which effectively increase the number of conduits in the drill pipe, albeit with decreased diameters.

It is seen, therefore, that an easily manufactured drill pipe has been provided, with a plurally of independent conduits extending uniformly throughout the length of the drill pipe. It will be discussed at length below the exact manner in which each such conduit may be utilized to optimize the drilling operation.

DRILL PIPE COUPLING

With reference again to FIG. 2, the joining together of drill pipes is accomplished by a threaded coupling collar 84. When so joined, the pressure integrity of each conduit is maintained by a seal 86, the details of which will also be described below.

The end of drill pipe 50 is coupled to the end of drill pipe 52 by a differential thread action between the external pipe threads 88 and 90 and the internal coupling collar threads 92 and 94. Additionally, the ends of each drill pipe have threads 88 and 90 with a different pitch. For example, the end of drill pipe 50 shown in FIG. 2 may have four threads 88 per inch (a pitch of 0.25) and the end of pipe 52 shown may have five threads 90 per inch (a pitch of 0.2). The coupling collar 84 is similarly threaded in that it has coarse threads 92 for engaging the corresponding threads on drill pipe end 50, and finer threads 94 (five threads per inch) at the other collar end to engage with the respective fine threads of drill pipe 52. It is to be noted that both the fine threads 94 and 90 and coarse threads 92 and 88 of both the coupling collar 84 and drill pipes 50 and 52 are uniform diameter threads throughout the respective threaded sections. However, the coarse thread 88 diameter of the drill pipe end shown 50 is larger than the fine thread 90 diameter of drill pipe 52 end. The coupling collar 84 has similar thread diameters. The aspect of different thread diameters permits the coupling collar 84 to be unscrewed from drill pipe 50 onto drill pipe 52 wherein the coarse threads 92 of coupling collar 84 do not become engaged with the fine threads 90 of drill pipe 52. In this manner, coupling collar 84 can be lowered onto drill pipe 52 until it abutts stop flange 96.

Because the ends of the illustrated drill pipes include threads of different pitch to provide differential coupling, the threads 88 and 90 are both either right-hand or left-hand threads. Preferably when pipes are coupled only by the coupling collar 84, the threads will be in the direction wherein the rotary action of the drill tends to tighten the coupling between drill pipes. Typically, the threads are cut in a right-hand direction. It is to be noted from the foregoing that the other ends of drill pipes 50 and 52 have thread pitches and diameters opposite that of the described pipe ends. In other words, each pipe has coarse threads 88 at one end and fine threads 90 at the other.

The coupling collar 84 is also of a larger diameter than the coupled drill pipes so that any wear due to rotary action against the bore hole wall will wear the collar 84 rather than the drill pipes. To that end, the drill pipe coupling collar 84 is made removable from drill pipe 52 by leaving a portion 98 on the coupling collar end annularly and internally recessed so as not to engage pipe threads 90. Alternatively,, coupling collar internal threads 94 could be extended to the end of the collar. Therefore, when the coupling collar 84 has experienced undue wear, it can be easily removed from drill pipe 52 and replaced. Normally,, and for reasons to be discussed below, drill pipes are usually stored or shipped with their respective coupling collars 84 screwed fully onto the drill pipe end in abutting relationship with stop flange 96.

With further reference to FIG. 2, and in keeping with the invention, the ends of drill pipes 50 and 52 are interengaged together, before being threadably coupled, to provide a means to transfer the rotational drive torque from one drill pipe to the next. In this manner, the rotational drive torque of the drill string is not transferred by way of the threaded coupling collar 84. Therefore, the threaded coupling collar 84 and pipe ends do not need coventional tapered box and pin threaded tool joints to transmit torque, which type of threads require expensive thread dies.

Figure 11:
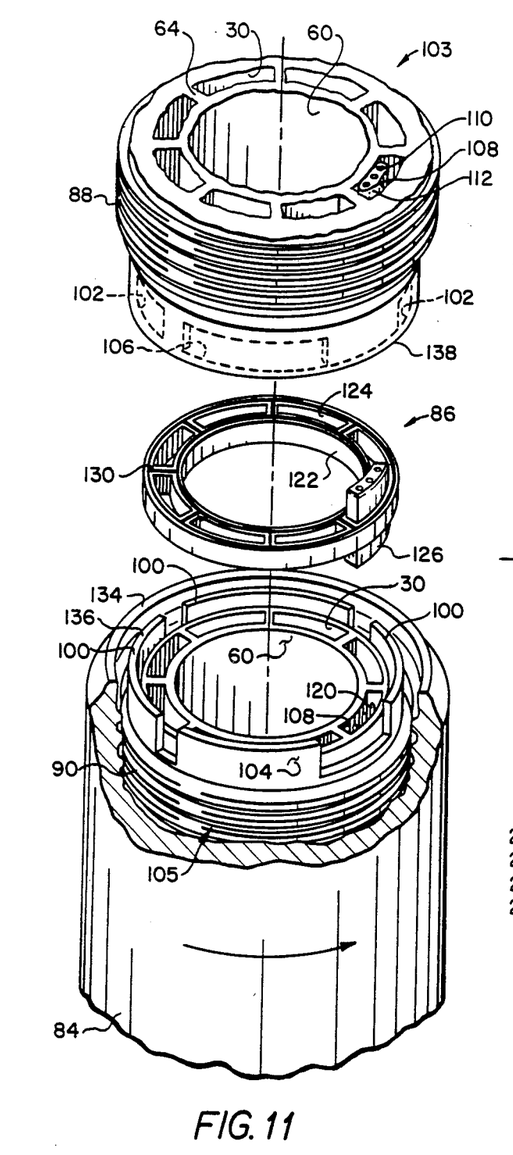
FIG. 11 is an isometric exploded view of a portion of drill pipe end sections to be joined with the seal.

FIG. 4 illustrates several drive lugs 100 received within respective drive recesses 102 to provide interengagement between coupled drill pipes. Reference to FIG. 11, which illustrates conduited drill pipes 103 and 105 with electrical wires 110, clearly shows the drive lugs 100 on drill pipe 105, and drive recesses 102 (in phanton lines) on the end of drill pipe 103. The interengagement between drill pipes 103 and 105 is essentially an interleaving arrangement of drive lugs 100 and recesses 102.

One lug 104 of drill pipe 105 and respective recess 106 of drill pipe 103 are sized differently than the other drive lugs 100 and drive recesses 102. Specifically, lug 104 is an index lug which, together with index recess 106, provide a way in which one drill pipe 105 may be joined to another 103 at a predetermined desired arcuate or rotational alignment. According to the invention, arcuate alignment between the drill pipes of a string is essential as it is necessary to maintain alignment of the drill pipe conduits throughout the drill string. In addition, it is even more important to maintain a particular arcuate alignment of the drill string pipes, such as 103 and 105, as one conduit, denoted as an electrical conduit 108, carries electrical wires 110 as a medium for supplying signals and power to downhole sensors, and signals upwardly from the sensors or tools to surface equipment. The term "signals" as used herein is intended to also encompass electrical power, such as from ac or dc sources.

Therefore, it is seen that not only is it necessary to maintain alignment between the fluid carrying conduits, but also to maintain a particular alignment because one such conduit 108 carries electrical wires. It is realized that in those applications where it is desired to use every conduit of the drill pipe for fluids, it is only necessary to provide drive lugs 100 and drive recesses 102 which maintain alignment of the conduits in general, but not for particular conduits. It is also expected that in some instances more than one conduit will carry electrical wires 110.

ELECTRICAL CONDUIT AND CONDUCTORS

As noted above, the capability of a drilling operation to receive instantaneous electrical signals from downhole sensors, such as 18 and 20, and operate in a closed loop manner can be advantageously used to modify procedures for optimizing the operation. As noted in FIGS. 7-10, an electrical conduit 108 of the drill pipe 103 carries three electrical wires 110 formed together in a harness 112. The harness 112 is preferably constructed with a durable cover, such as Teflon or Kyner material so that any frictional movement between the harness 112 and interior surface 114 of the conduit 108 during drilling will not result in an electrical short circuit.

Each electrical wire 110 is terminated at the pipe end in a connector block 116 having three wire terminals 118 and associated pin contacts 120. Each electrical wire 110 is soldered to a terminal 118 of its respective pin contact 120. The connector block 116 at each end of a drill pipe may be cemented or otherwide sealed within the electrical conduit 108, or attached therein by other suitable hardware (not shown).

CONDUIT SEAL

Figures 5, 6, 7:
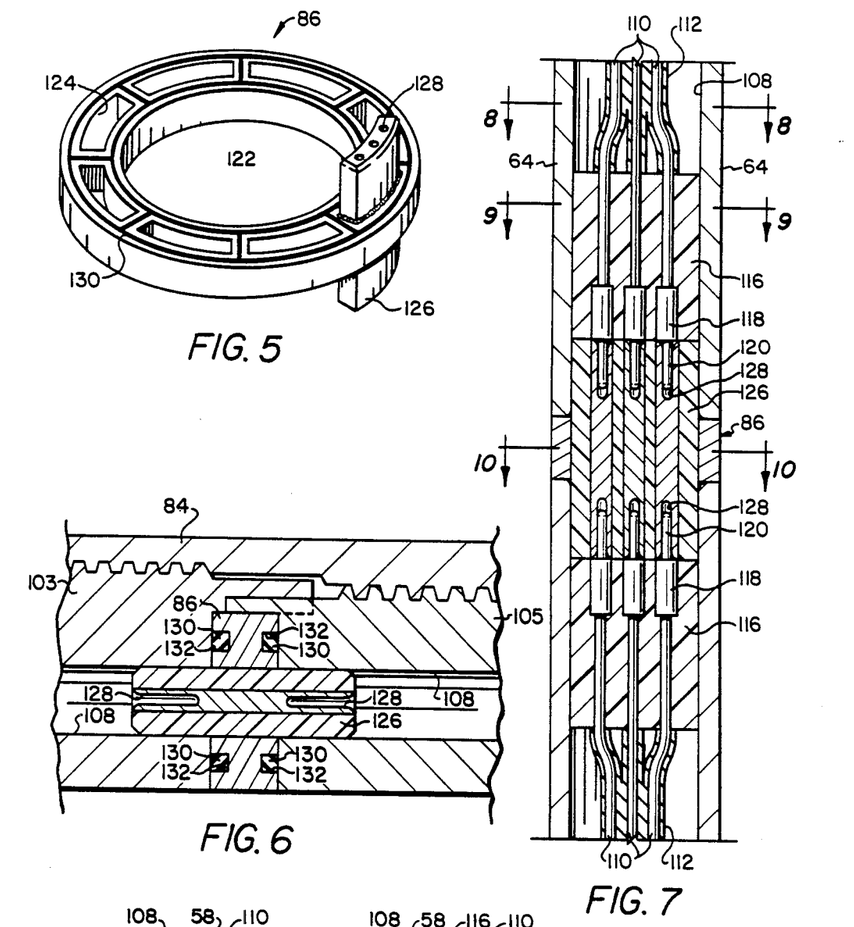
FIG. 5 is an isometric view of the pipe seal, and an intermediate electrical connector fixed therein.
FIG. 6 is a cross-sectional view at the juncture of joined drill pipes, illustrating the seal and the intermediate electrical connector.
FIG. 7 is a cross-sectional view of joined drill pipe conduits carrying the electrical conductors, connectors and contacts.
Figure 8:
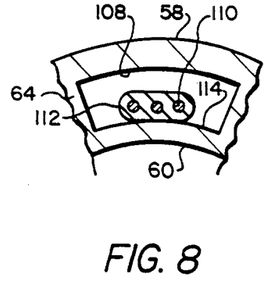
FIGS. 8-10 are cross-sectional views taken along respective lines 8—8, 9—9 and 10—10 of FIG. 7.
Figure 9:
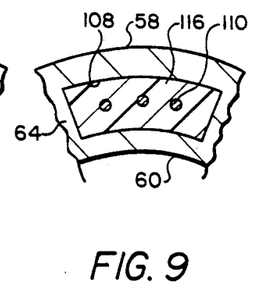
Figure 10:
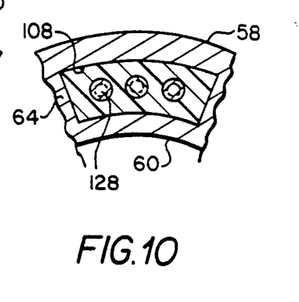

In maintaining electrical continuity, as well as fluid continuity between the respective conduits of one drill pipe to another, a seal 86 is provided as shown in FIG. 5. The seal 86 is planar in nature and cross-sectionally shaped similar to that of the illustrated drill pipe. Particularly, the seal 86 of FIG. 5 is cross-sectionally similar to the drill pipe embodiment of FIG. 3a, and is constructed as a gasketed steel plate-like insert positioned between the drill pipe ends. From the description which follows, it is well within the ambit of those skilled in the art to construct conduit seals for use with the drill pipes of FIGS. 3b-3d. As shown in FIG. 5, the seal 86 includes a central passage 122 and equidistantly spaced individual peripheral passages 124 therearound. In one such passage, an electrical socket-type intermediate connector 126 is fixed, as shown in FIGS. 5-7. The intermediate connector 126 has socket contacts 128 in each end thereof and into which the pin contacts 120 of the pipe connector blocks 116 are frictionally insertable to assure high quality electrical connections from drill pipe to drill pipe. Moreover, the socket contacts 128 and pin contacts 120 are plated with gold or other suitable material to avoid the adverse oxidation effects prevalent in the well drilling environment.

Intermediate connector 126, as with the drill pipe connector blocks 116, may be cemented or otherwise fixed into the seal plate 86. Alternatively, the intermediate connector 126 may be provided with mounting hardware for "floating" the connector within the seal 86. This aspect allows the intermediate connector 126 a certain degree of lateral movement within the seal 86 to accommodate small dimensional differences between aligned drill pipes.

The provision of the seal 86, as well as the intermediate connector 126, is a departure from the customary drill pipe electrical connections. The intermediate connector 126 is of great practical advantage insofar as it permits both drill pipe ends to be fitted with a pin contact type connector blocks 116. With this symmetrical arrangement, the seal 86 has no right side up orientation, but rather can be be quickly installed with either end of the intermediate connector 126 applied to either pipe end. In addition, the manufacture of the exemplary drill pipe is simplified as only a pin type connector block 116 need be installed in the electrical conduit 108 of each pipe end.

Importantly, the seal 86 includes a sealing or gasket means in the nature of a rubber or elastomer 130 encircling each of the peripheral passages 124, including the central passage 122. In the preferred form of the seal 86, a groove 132 is cut into each face side of the seal 86, circumscribing the seal network around adjacent peripheral and central passages 124 and 122. For ease of construction of both the seal 86 and the elastomer gasket 130 the groove 132 between adjacent passages is common thereby enabling the elastomer gaster 130 to be made in a single piece. As noted in FIG. 6, when drill pipes 103 and 105 are interlocked together and firmly coupled by the collar 84, the elastomer gasket 130 is squeezed tightly within its groove 132 to form a high quality seal and insure the pressure integrity between the respective fluid and electrical conduits. With this type of seal, pressure differentials upwardly of 50,000 p.s.i. may be sustained in the conduits. For clarity, the electrical connector blocks 116 in the electrical conduit ends of FIG. 6 have been omitted.

An additional advantage of the drill pipe according to the invention can be seen from FIG. 11 where the coupling collar 84, as it is shown, is abutted against the stop flange 96 (not shown). The coupling collar 84 is of such a length that when completely receded on drill pipe 105 the terminal edge 134 thereof is at least flush with the terminal edges 136 of the lugs so that such lugs cannot be easily broken or damaged during storage or handling. In the same vein, and to reduce vulnerability to damage, the terminal end of the mating drill pipe 103 has a continuous cylindrical rim 138 therearound with the drive and index recesses 102 and 106 on the inside surface thereof. Therefore, because of the continuous nature of the rim 138 the terminal end of such drill pipe 105 is less susceptible to damage. This is highly desirable as it can be seen that an entire drill pipe can become unreliable if the lugs 100 and 104 or recesses 102 and 106 become excessively damaged.

With the foregoing in mind, it can be appreciated that many drill pipes can be quickly and easily coupled together in a desired arcuate alignment, with each fluid passage and electrical conduit maintaining its integrity throughout the drill string.

QUILL SECTION

Figure 12:
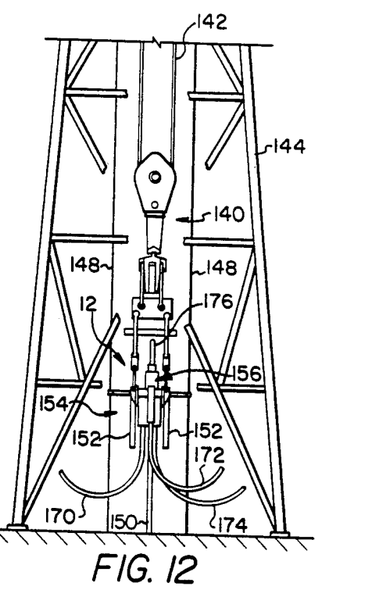
FIG. 12 is front elevational view of an exemplary well drilling derrick showing the goose-neck swivel and attached drill pipe suspended therefrom.
Figures 13, 14, 15:
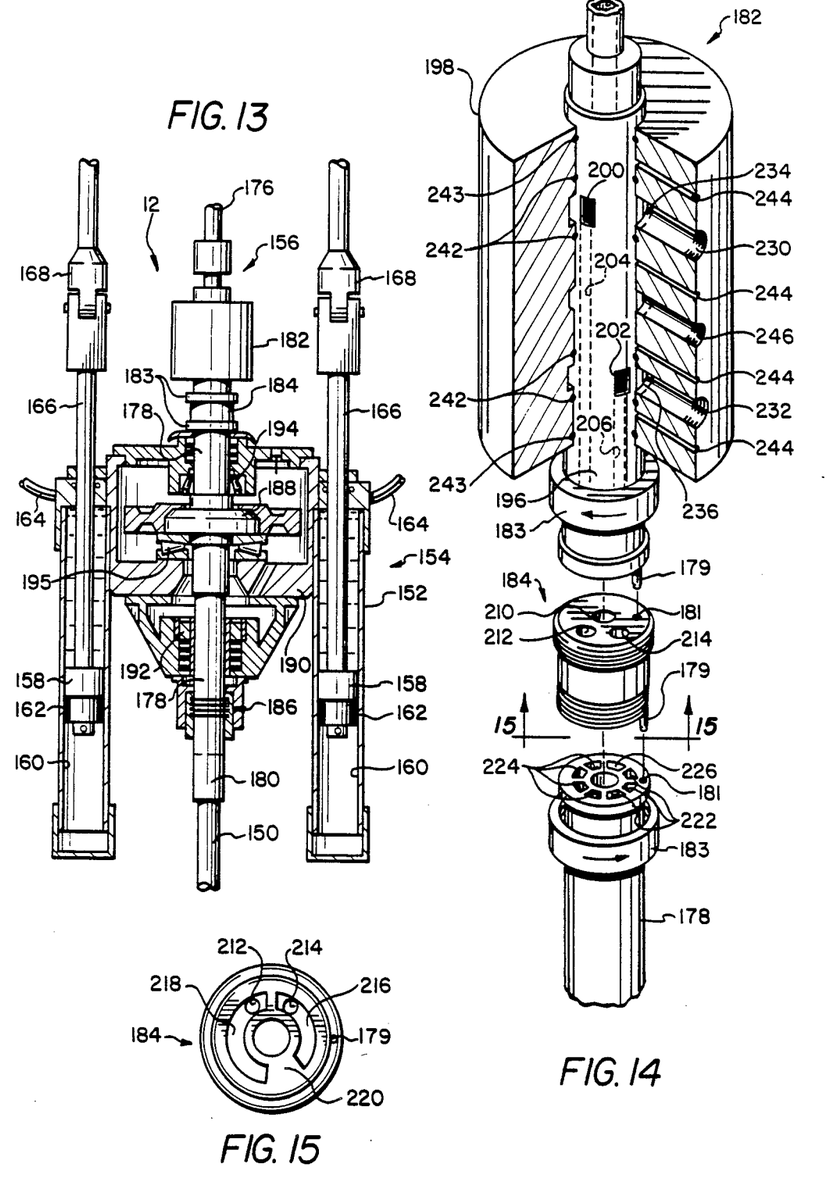
FIG. 13 is a cross-sectional side view of the gooseneck swivel illustrating the placement of the fluid and electrical commutators on the quill section, together with the drill pipe drive equipment.
FIG. 14 is an isometric view of the fluid distribution manifold and the commutator shaft, with a portion of the manifold quarter sectioned to illustrate the shaft inlet ports in fluid communication with the annular grooves of the manifold.
FIG. 15 is a bottom view of the adaptor of FIG. 14 illustrating the manner in which two or more pipe conduits may be commoned with a single commutator shaft passage.

Central to a principal feature of the invention, there is shown in FIGS. 12 and 13 the surface apparatus of the drilling operation utilized to communicate fluids and electrical signals to and from the drill string. A hoist structure 140, suspended from a cable 142 connected to a derrick frame 144, holds the goose-neck swivel 12 in suspension above the well head (not shown). Cable take-up and release means (not shown) provide gross adjustments of the drill string within the well bore, and thus gross adjustments of the drill bit weight. Torque arresting cables 148 prevent the goose-neck swivel 12 from rotating together with the topmost drill pipe 150.

Fine vertical adjustments of the goose-neck swivel 12 above the well head are supplied by a pair of gas-over-oil hydraulic cylinders 152 supporting the quill 154 and washpipe 156 sections of the goose-neck swivel 12 to the hoist structure 140. As noted in FIG. 13 the hydraulic cylinders 152 each have a piston 158 located in a partially fluid-filled cylinder 160 for maintaining a desired drill bit weight. Each piston 158 includes circumferential seals 162 therearound to seal each such piston 158 against the inner wall of the cylinder 160 and maintain the oil above the piston 158 separate from atmospheric pressure below the piston 158. The upper portion of each hydraulic cylinder 152 is coupled to a gas over oil source (not shown) by hoses 164. It can be appreciated then that a high gas pressure in the source results in a lightened drill bit weight. A piston rod 166 of each hydraulic cylinder 152 is connected to the hoist structure 140 by knuckle joints 168. Various fluids are coupled to the goose-neck swivel 12 through high pressure hoses 170, 172 and 174 of FIG. 12. High pressure hose 176 atop the goose-neck swivel allows fluid to be pumped down or extracted from the central bore of the drill pipe 150.

In the description and drawings hereof, certain elements common to drilling operations, such as the motor drive of the drill string, the blow-out preventer at the well head, etc., have been omitted or only briefly described as such elements do not contribute to the invention and the existence and use thereof is well within the competence of those skilled in the art.

The goose-neck swivel 12 of FIG. 13 is primarily comprised of a quill section 154, which includes a quill shaft 178 connected at its bottom end to the top-most drill pipe 150 with a tubular collar 180, a washpipe 156 and fluid commutator 182. An adaptor 184 is effective in coupling the fluid commutator 182 to the quill shaft 178. The adaptor 184 as well as the quill shaft 178 have fluid passages therein for communicating desired fluids to ones of the drill pipe conduits. The manner in which various fluids are commutated to desired drill pipe conduits will be treated more fully below.

The goose-neck swivel 12 further includes an electrical commutator 186 for maintaining electrical connections to each of the drill string wires 110 while the drill string is rotating. The quill shaft 178 is driven by a gear 188 splined to the quill shaft 178 through a hydraulic or electric motor (not shown). The motor drive unit is housed in a frame 190 through which the quill shaft 178 rotates in bearings 192, 194 and in thrust bearings 195. Suitable oil seals are also provided for shaft 178.

FLUID COMMUTATOR

A simplified version of the fluid commutator 182 is shown in FIG. 14 wherein a commutator shaft 196 is rotatable within a fluid manifold 198 and includes high pressure seals which will be thoroughly discussed in connection with FIG. 16. Commutator shaft 196 includes a number of inlet ports 200 and 202 corresponding to the different number of fluids desired to be pumped through the various drill pipe conduits. For exemplary purposes, only two fluid sources are connected to the fluid commutator 182. For each inlet port 200 and 202 there is a corresponding fluid passage 204 and 206 (shown in phantom) within the commutator shaft 196, each such passage having an outlet on the bottom end of the commutator shaft 196. The commutator shaft 196 also has a central bore 208 therethrough and through which drill fluid or the like is communicated to the central conduit 62 of the drill pipe 150.

FLUID CONDUIT ADAPTOR

The adaptor 184 provides an interface between the commutator shaft 196 and the quill shaft 178. The adaptor 184 is secured between the commutator shaft 196 and quill shaft 178 by a pin 179 and recess 181 arrangement, and jam nuts 183. FIG. 14 illustrates a perspective top view of the adaptor 184 having a central bore 210 in communication with the commutator shaft central bore 208, and two channels 212 and 214 in communication with the commutator shaft passages 204 and 206. FIG. 15 illustrates the configuration of the bottom side of the adaptor 184. In the illustrated embodiment of the quill section 154, it is desired to pump two different fluids down various drill pipe conduits. Therefore, the bottom side of adaptor 184 includes hollowed-out areas 216 and 218 around respective passage channels 214 and 212. With this construction, channel 214 is placed in fluid communication with three corresponding quill shaft conduits 224, while channel 212 is placed in fluid communication, for example, with four other corresponding quill shaft conduits 222. The remaining conduit 226 in the quill shaft 178 is plugged by the non-apertured area 220 on the adaptor 184.

Essentially then, inlet port 204 of the commutator shaft 196 is capable of distributing one type of fluid to four adjacent quill shaft conduits 222, and thus four corresponding drill pipe conduits. Similarly, inlet port 202 is adapted to distribute another drill fluid to three adjacent drill pipe conduits. It should be apparent now that a variety of adaptors may be provided at the drill site for use in distributing fluids of a number of fluid sources to a number of drill pipe conduits. This is accomplished by providing different configurations of hollowed-out within or areas on the bottom side of the adaptor 184.

Moreover, drilling operators may find from the teachings of the present invention that more than two fluid sources at different pressures can be used to optimize the drilling operation. In that event, it will be apparent from the description the manner in which a three or four inlet port commutator may be developed to distribute a like number of different fluids to the drill pipe conduits.

Figures 16, 18, 19:
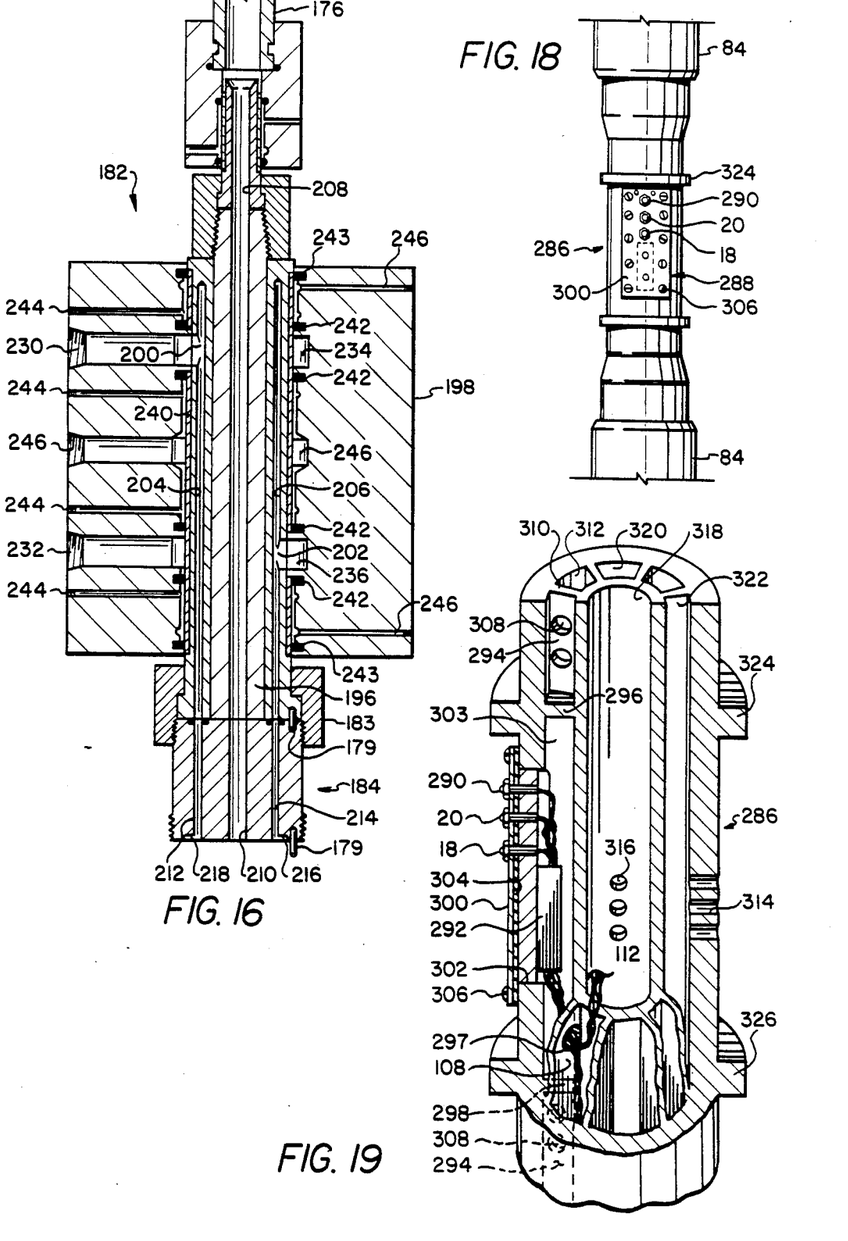
FIG. 16 is a side cross-sectional view of the fluid commutator illustrating the connection of the manifold annular grooves to the respective various shaft inlet ports, and the connection through the shaft passages to the quill section.
FIG. 18 is a side plan view of a cross-over sub according to the invention with sensor equipment attached thereto.
FIG. 19 illustrates a cross-over sub cross-sectioned to show a blocked portion of a fluid conduit used to house downhole sensors and telemetry equipment, with cross-over apertures around the blocked conduit portion.

In FIGS. 14 and 16, and in more detail, the fluid manifold 198 has input passageways 230 and 232 connected on the outside thereof to respective fluid sources, and on the inside thereof to commutator shaft inlet ports 200 and 202 by a pair of annular grooves 234 and 236. Inlet port 200 is therefore in continuous communication with fluid as it rotates within its respective annular groove 234. Similarly, inlet port 202 is in continuous communication with another fluid by way of its annular groove 236.

Because the fluid commutator 182 is subjected to fluid pressures limited only to the strength of connecting hoses 170–174 (FIG. 12), a special arrangement must be provided for maintaining a seal between the annular grooves 234 and 236 and the rotating commutator shaft 196. The high pressure sealing arrangement more clearly depicted in FIG. 16 is utilized in the fluid commutator 182 of the goose-neck swivel 12 so that the various high pressure fluids can be used to facilitate the downhole drilling operation. The exterior surface of the commutator shaft 196 is faced with a ceramic material 240 which provides a durable and long lasting bearing surface for the shaft 196 within the fluid manifold 198.

Around each annular groove 234 and 236 are high pressure seal rings 242 which seal the fluid manifold 198 to the ceramic facing 240 of the commutator shaft 196. Low pressure seals 243 are disposed on opposing ends of shaft 196. Low pressure seals 243 are disposed on opposing ends of shaft 196. To counteract the high pressure exerted on one side of a high pressure seal 242, another high pressure fluid is applied to the opposite side of the high pressure seal 242. In this manner, the differential pressure on each side of the high pressure seal 242 is reduced and the possibility of pressure blow outs is also reduced. Accordingly, high pressure seal fluid inlet ports 244 have been provided, as shown in FIG. 16, for supplying a fluid under high pressure to one side of each high pressure seal ring 242, to equalize the pressure on the other side of the high pressure seal ring resulting from high pressure drill fluids pumped down the drill pipe conduits. A number of low pressure seal fluid outlet ports 246 have been provided for returning the leakage pressure control fluid which equalizes the high pressure seals 242 back to a reservoir (not shown).

Without repeating the details of high pressure sealing, the central bore 208 in the commutator shaft 196 may be sealed by the same high pressure technique discussed above.

It should be understood that the invention, according to the foregoing description affords a drilling operator the ability to selectively inject a different number of extremely high differential pressure fluids into any number of different drill pipe conduits and apply the fluids to downhole equipment to, for example, clean or cool drill bits, aerate drilling fluid or aid the cavitation or erosion of the formation, or effect each operation simultaneously.

ELECTRICAL COMMUTATOR

Figure 17:
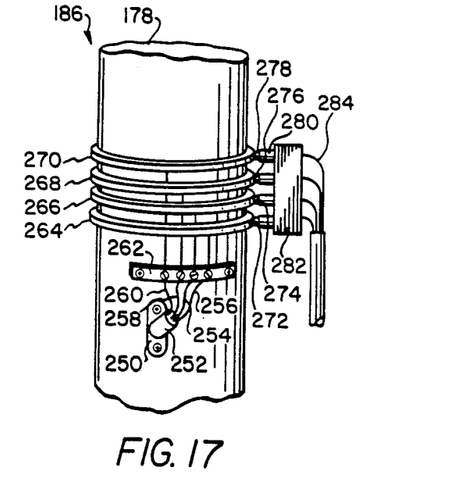
FIG. 17 illustrates the electrical slip rings on the quill shaft, with the corresponding brushes for communicating electrical signals to or from the drill pipe wires.

An electrical commutator, generally designated 186 in FIG. 17 provides continuity of electrical connections between the rotating wires 110 within the drill pipe, and the surface monitor equipment 22. The drill pipe electrical wires 110 are coupled from the topmost drill pipe 150 and through a corresponding connector (not shown) at the bottom of the quill shaft 178. Electrical wires within the quill shaft 178 are also connectorized by a connector 250 at their top end and are finally connected to connector 252 of FIG. 17. For exemplary purposes here, four electrical wires are carried through the drill pipes 150. Four corresponding conductors 254, 256, 258 and 260 are fastened to a terminal block 262. From the terminal block 262 each of the four conductors are connected to a respective slip ring 264, 266, 268 amd 270. The slip rings are constructed of brass, or other suitable electrically conducting material, are fixed to the quill shaft 178 and thus rotate with such shaft.

The electrical signals carried by the respective wires 110 from the downhole sensors are thus present on each of the respective rotating slip rings 264-270. Four brushes 272, 274, 276 and 278 are held in compression against the respective slip rings to provide a reliable electrical contact therewith. The brushes are stationary and are pressed against the respective slip rings by brush holders, such as shown by reference character 280. The brush holders are fixed in a block 282 which, in turn, is fastened to the goose-neck swivel frame. Within the block 282, individual conductors such as 284 are connected to the individual brushes 278 to carry the electrical signals to the monitor equipment. The electrical commutator 186 is covered by a protective cover (not shown) to avoid exposure of the slip rings to the harsh well drilling environment.

It is seen, therefore, that the invention provides for a number of electrical wires 110 to be routed through the drill string to downhole apparatus. The electrical signals from the downhole apparatus are instantly available to the surface monitor equipment 22 and can thus be acted upon accordingly.

CROSS-OVER SUB

With regard to a further feature of the invention there is illustrated in FIGS. 18 and 19 a cross-over sub 286 which is ideally suited to operate in conjunction with the improved drill pipe to expand its versatility. The cross-over sub 286 is a short section of drill pipe with collar couplings as described above, and with a provision for sensor equipment generally designated 288. Specifically shown are three sensors, a pressure sensor 290, a PH sensor 20 and a temperature sensor 18.

Each sensor is electrically operated and is thus connected to telemetry or transducer apparatus 292 for converting the sensor physical inputs to electrical signals for transmission to the surface monitor equipment. As shown, the telemetry apparatus 292 is wired to the electrical wire harness 112 which extends upwardly in the drill string to the slip rings. The wire harness 112 is disposed in the electrical conduit 108.

Because there may be insufficient room in the electrical conduit 108 for sensors and telemetry equipment, a part of a fluid conduit 294 has been blocked off by separators 296 and 298. A duct 297 connects the blocked off portion 303 with the electrical conduit 108 so that electrical wires 110 can be routed from the electrical conduit 108 to the telemetry equipment 292 located in the blocked off portion 303. An access and mounting plate 300 mounts into an access opening 302 in the blocked off portion 303 of the fluid conduit 294. The mounting plate 300, along with a gasket 304 is secured by screws 306 to the wall of the cross-over sub. A conventional rubber gasket 304 is sufficient as the blocked conduit 303 is not subjected to extreme pressures.

A plurality of cross-over openings 308 are formed into conduit divider 310 for allowing the fluid from the upper part of conduit 294 to be rerouted through fluid conduit 312, around blocked off conduit portion 303, and back into the lower part of conduit 294.

In order to reduce the hydrostatic head at the bore site it is customary to aerate the drill fluid. Accordingly, the exemplary cross-over sub 286 is provided with external aeration apertures 314 for aerating the drill fluid in the annulus 44 of the wellbore, and internal aeration apertures 316 for aerating the drill fluid in the central conduit 318. As noted from FIG. 19, to provide internal and external aeration, fluid conduits 320 and 322 which are connected to the respective central conduit 318 and the well bore annulus by the noted apertures, are provided with a pressurized gas such a nitrogen. It should be apparent that a single cross-over sub 286 may not normally include all the features of the illustrated sub. Also, specialized drill pipes of the above described type may be fitted with one or more of the features described in connection with the cross-over sub 286.

Collets 324 and 326 provide protection for the sensors against damage either during storage or when used downhole. The collet 324 also acts as a stop for the coupling collar 84.

The cross-over sub 286 therefore provides a means in which to mount environmental formation sensors in the drill string, while yet permitting fluid flow in each fluid conduit. It is realized that when using the cross-over sub 286 the same fluid should be pumped into conduits 294 and 312 since such conduits are placed in fluid communication by the openings 308.

ANNULAR ACCUMULATOR

Figure 20:
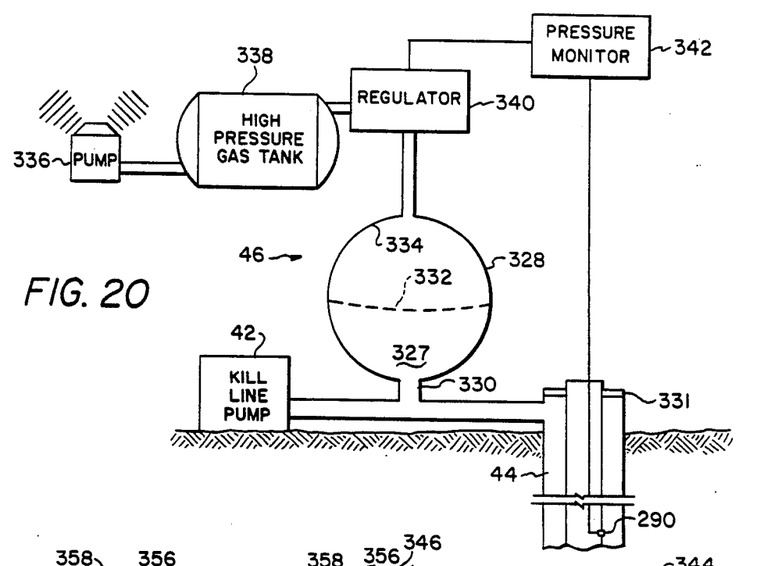
FIG. 20 illustrates in symbolic form the components of the annular accumulator for applying a desired pressure to the drill mud in the annular area of the well.

An annular accumulator 46 is shown in FIG. 20. This apparatus enables selective mechanical adjustments in the wellbore hydrostatic head for improved wellbore integrity and to provide the ability to make continuing adjustments as differing geopressures are encountered. Specifically, this apparatus prevents those events from occurring which can lead to a disastrous and costly well blowout. Normally, an excessive building of pressure downhole is conuteracted by increasing the density of the drill mud in the annulus 44 of the wellbore. In the event pressure builds up too quickly, or if the drilling operators are inattentive to such buildup, the drill mud density cannot be changed quickly enough to avert a blowout.

The annular accumulator 46 addresses this very problem by providing the capability of quickly changing the effective density of the drill mud 327 by applying pressure thereto in the wellbore annulus 44. The annular accumulator 46 comprises a reservoir 328 connected to the wellbore annulus 44 through appropriate plumbing 330. A rotating head 331 forms an annular seal around the drill pipe to provide a close system.

The reservoir 328 includes a flexible diaphragm 332 which separates the drill mud 327 from the pressurized gas 334 thereabove. It is seen that with an increase in the gas pressure on the diaphragm 332, and thus on the drill and mud 327, the effective density of such mud is increased. A gas pump 336 compresses a gas into a relatively large volume supply tank 338 so that on demand the gas 334 pressure in the accumulator reservoir 328 can be quickly increased. A regulator 340 is adjustable and permits a regulation of the gas 334 between the supply tank 338 and the accumulator reservoir 328. Thus, on an indication of a pressure adjustment requirement, the regulator 340 may be opened to increase the gas pressure on the drill mud 327, and thus increase its effective density.

According to an important aspect of the invention, the regulator 340 can be automatically adjustable, and connected to a surface pressure monitor 342 for automatically adjusting the accumulator reservoir 328 pressure based upon instantaneous downhole pressure changes sensed by the pressure sensor 290. Therefore, through the closed loop system imminent blowout catastrophes can be detected early and avoided with the present invention. In addition, the pressure monitor 342 can be utilized to initiate operation of pump 42 in order to maintain the downhole fluid levels at the desired magnitude.

IMPROVED DRILLING METHOD

Having described the apparatus of the invention in what is conceived to be the most practical and preferred embodiment, an improved method of drilling, using such apparatus will now be described. With this in mind, attention should be directed to FIGS. 21-23 where there is illustrated an enlarged drill pipe and wellbore utilizing the various features of the invention.

Figure 21:
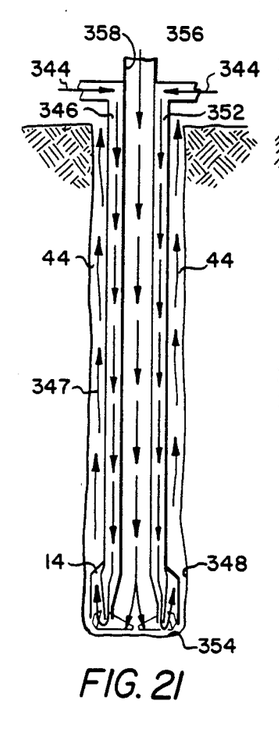
FIG. 21 is a sectional plan view of the multi-conduit drill pipe and attached bit using a high velocity fluid in some conduits for cutting the formation and cleaning the drill bit, and illustrating other low pressure fluids in other conduits for carrying cutting chips upwardly around the annulus area.

In FIG. 21 there is shown a method of drilling using a liquid 344, such as a drill fluid of a first density, pumped downhole in one or more conduits 346 to facilitate the removal of formation chips 347 from the drill bit 348 area. The chips 347 suspended in the drill mud are carried upwardly in the well bore annulus 44 to the surface. The drill fluid 344 is also pumped downhole in other conduits 352. In these conduits 352 the drill fluid 344 is under considerably more pressure than that in conduit 346 and is directed into the drill bit boring path 354 to quickly remove the chips 347 out of the boring path 354. Drill fluid 356 of a second density may be pumped down the drill pipe central conduit 358, and at the drill bit area 348 be mixed with the drill fluid 344, the combination of which is forced upwardly in the wellbore annulus 44 carrying formation chips 347.

Figure 22:
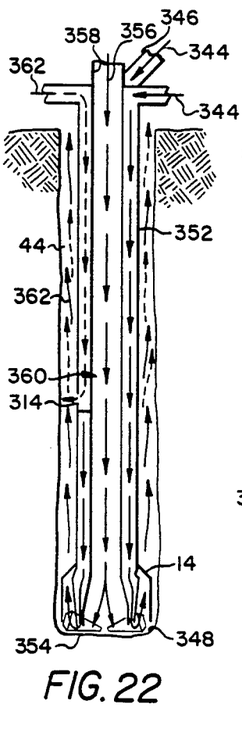
FIG. 22 is another view similar to that of FIG. 21 wherein a gas is forced down one drill pipe conduit, and vented downhole for decreasing the hydrostatic pressure thereat.

The drilling operation represented in FIG. 22 is similar to that of FIG. 21, but in addition includes one type of cross-over sub 360 in which pressurized nitrogen gas 362 is pumped through external aeration apertures 314 into the wellbore annulus 44 to aerate the mixed density drill fluid thereby reducing its effective density. Stated in another way, this aeration reduces the hydrostatic pressure in the drill bit area 348. It can be appreciated then that between the aeration in this example and the pressure exerted on the drill fluid by the annular accumulator 46, the density of the drill fluid can be quickly changed, and changed within a wide range.

Figure 23:
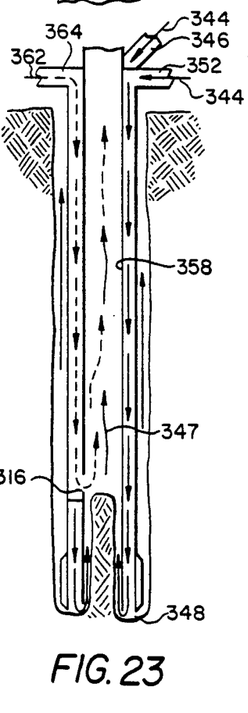
FIG. 23 illustrates a drilling operation employing a liquid and gas reverse circulation and coring technique.

FIG. 23 illustrates a coring operation wherein the drill fluid 344 is applied to the drill bit area 348 through certain conduits 346 and 352, and reverse circulated upwardly with the formation chips 347 through the central conduit 358 of the drill pipe. In addition, circulation of the drill fluid 344 is enhanced by aeration in the nature of compressed gas 362 pumped down fluid conduit 364 and expelled into the central conduit 358 through internal aeration apertures 316. Fluids can alternatively be injected into the outer annulus of the drill pipe to properly condition the outer area.

It will also be understood that the configuration shown in FIG. 23 could be modified by utilization of the drill bit 14 of FIG. 21. In this embodiment, the chip size will be reduced in order to enhance full pneumatic transfer uphole.

From the foregoing, an improved well drilling apparatus and method have been described. It can be appreciated that many of the various aspects and features described above may be combined to further enhance the drilling operation. For example, sensors other than those disclosed can be mounted to the drill pipe to sense desired formation data, much like the pressure sensor as noted above, and be coupled to surface equipment to modify the drilling operation. Such a closed loop system eliminates the intervention by operators who may delay in acting upon the information, or not act at all. Moreover, such a closed loop operation permits continuous adjustments, of whatever magnitude, on the drilling operation with the aim of optimizing the sytem efficiency.

In an important aspect of the invention, the three functions of (1) maintaining chemical and pressure integrity in the wellbore, (2) circulation of cuttings out of the hole, and (3) assisting in the cutting or erosion of the formation are able to be isolated and therefore independently manipulated and controlled. The present invention can thus use multiple and separate fluids, and combinations thereof, to perform the three functions noted above. This ability contrasts with the prior art wherein the three above-noted functions were not able to be isloated and independently manipulated or controlled.

While preferred embodiments of the methods and appartus have been disclosed with reference to specific constructions of the drill pipes, conduits, coupling and the like, it is to be understood that many changes in detail may be made as a matter of engineering choices without departing from the scope of the invention as defined by the appended claims. Indeed, those skilled in the art may prefer, for example, to embody the cross-over sub features directly into a drill pipe or drill bit, and in light of the invention they will find it easy to implement that choice. Also, it is not necessary to adopt all of the various advantageous features of the present disclosure into a single composite drill pipe in order to realize their individual advantages. Moreover, the scope of the invention is not to be limited to the details disclosed herein, but is to be accorded the full scope of the claims so as to embrace any and all equivalent apparatus and methods.

What is claimed is:

1. In a drill pipe of the type having ends adapted to be connected with ends of other similar drill pipes to form a drill string, and including a plurality of independent conduits arcuately spaced from each other so as to require arcuate alignment of said drill pipe with the other similar drill pipes, each said conduit extending substantially through the drill pipe, the improvement comprising a planar round seal shaped similar to the end of said drill pipe and including a plurality of openings corresponding to said plurality of conduits, said seal being effective to provide a seal around the end of each said conduit, and an index lug extending axially outwardly from one end of said pipe and an index recess extending axially inwardly on the other end thereof, said index lug and index recess being matable with a respective index recess and index lug on other similar drill pipes so that the conduits of said drill pipe are aligned with the conduits of said other similar drill pipes in a predetermined arcuate orientation and a drive lug and drive recess arrangement, said drive lug extending axially outwardly from said one end of said pipe, said drive lug and said index lug being arcuate shaped to define a round depression for receiving therein said seal.

2. The drill pipe of claim 1 further including a plurality of drive lugs on one end of said drill pipe and a corresponding plurality of drive recesses in the other end thereof, each said drive lug and drive recess being different than said respective index lug and index recess so the engagement of said index lug with one said drive recess is prevented.

3. In a well drilling pipe having a bore therethrough for carrying fluids, the combination comprising:
   a fluid conduit for carrying a fluid and independent of said bore, said fluid conduit having sidewalls formed integral with the sidewalls of said bore;
   an electrical conduit in said pipe independent of said bore and of said fluid conduit, said electrical conduit having sidewalls formed integral with the sidewalls of said fluid conduit and integral with the sidewalls of said bore;
   an electrical conductor disposed in said electrical conduit;
   an electrical connector disposed at each end of said electrical conduit providing a termination for said conductor;
   means for circumferentially sealing each end of said electrical conduit so that said electrical conduit remains sealed from said fluid conduit and so that said connectors and said conductor are also sealed from the fluids carried in said pipe; and
   index means on each end of said drill pipe for preventing rotational movement of said drill pipe about a torsional axis with respect to other similar drill pipes to be connected therewith, whereby the electrical conduit is matable only with electrical conduits of other similar drill pipes.

4. The well drilling pipe of claim 3 wherein the connectors disposed at each end of said electrical conduit include a pin contact.

5. A connection between a first and second multi-conduited drill pipe of a drill string having electrical wires in one conduit of each said pipe, said one conduit defining an electrical conduit, comprising:
   electrical connector means terminating the end of each said wire and fixed in an end of the electrical conduit of each said first and second drill pipe;
   seal means disposed between said end of said first and second drill pipe for sealing each conduit of said first drill pipe to corresponding conduits of said second drill pipe;
   intermediate connector means fixed in said seal means and partially insertable into the electrical conduit opening of said first and second drill pipe for mating with said electrical connector means and for rotationally aligning said first drill pipe to said second drill pipe; and
   means for coupling said first drill pipe to said second drill pipe with said seal means therebetween and without rotational movement of said first drill pipe with respect to said second drill pipe.

6. The drill pipe connection of claim 5 further including drive means for interengaging the end of said first drill pipe to the end of said second drill pipe, wherein said first drill pipe is drivingly connected to said second drill pipe.

7. The drill pipe connection of claim 6 wherein said drive means comprises interengaging lugs and recesses.

8. The drill pipe connection of claim 7 wherein said lugs and recesses are disposed circularly around the ends of said first and second drill pipes.

9. The drill pipe connection of claim 8 wherein said seal means fits within said drive means.

10. A drill pipe for use in well drilling operations and adapted for carrying fluids and electrical signals, comprising:
    a drill pipe having opposing ends with a concentric inner and outer side wall, said inner side wall defining a central conduit through which fluids are carried;
    a plurality of individual elongate conduits extending axially through said drill pipe substantially from one end to the other end of said drill pipe, each said conduit being located between said inner and outer sidewalls and equidistantly spaced around said central conduit;
    an electrical connector with an electrical contact fixed in each end of one conduit of said plurality, said one conduit defining an electrical conduit;
    en electrical wire connecting the contact of one said connector to the contact of the other said connector;
    a drive lug, and an index lug different from said drive lug, each integral with said drill pipe and extending axially beyond one said end;
    a drive recess, and an index recess different from said drive recess, each recessed inwardly in the other end of said drill pipe;
    a set of external threads around each end of said drill pipe, one set thereof having a different number of threads per inch than the other said set; and
    an internally threaded collar rotatable and disposed on one end of said drill pipe, said collar having a first set of internal threads engagable with said one set of pipe external threads, and a second set of internal threads corresponding to said other set of external threads of said drill pipe.

11. The drill pipe of claim 10 in combination with a seal for use in joining said drill pipe to another similar drill pipe, said seal comprising:
    a rigid planar plate having a cross-sectional shape substantially the same as the cross-sectional shape of that part of said drill pipe which peripherally surrounds said plurality of conduits and said central conduit, a groove in each face surface of said seal surrounding voids therein corresponding to openings of said conduits; and
    an elastomeric gasket shaped to fit into each said groove, whereby when said drill pipe and said other similar drill pipe are compressively coupled together the pressure integrity of said plurality of conduits and said central conduit is maintained between said drill pipes.

12. A coupler adapted for use with a multi-conduit drill pipe for removably coupling an end of a first and second said drill pipe to form a drill string, comprising:
    a first set of uniform diameter external threads at the end of said first drill pipe;
    a second set of uniform diameter external threads at the end of said second drill pipe, the diameter and pitch of said second set of external threads being larger than said first set of threads;
    a cylindrical coupling collar having at one end thereof a first set of uniform diameter internal threads matable with the external threads of said first drill pipe, and a second set of uniform diameter threads matable with the external threads of said second drill pipe; and interengaging means located on the end of said first and second said drill pipes for keying said pipes together in a predetermined angular alignment and to prevent respective rotational movement of said first drill pipe with respect to said second drill pipe;

whereby when said pipes are butted together and interengagingly keyed, said collar may be rotated from said pipe having the smaller diameter threads onto the pipe and having the larger diameter threads and thereby clamp said pipes together through differential thread action.

13. The coupler of claim 12 further including a stop flange around said drill pipe having the smaller diameter external threads for preventing said coupling collar from sliding toward the mid-section of said drill pipe.

14. The coupler of claim 13 wherein said stop flange is spaced from the end of said drill pipe a distance such that when said coupling collar is abutted thereagainst the terminal end of said coupling collar extends axially outwardly a short distance beyond said interengaging means for protection thereof.

15. The coupler of claim 12 wherein said coupling collar is removable from said drill pipe.

16. The coupler of claim 12 further including an elastomer seal having multiple openings corresponding to the openings of the conduits of the drill pipe, said elastomer formed for circumscribing one end of each said conduit opening, said seal being interposed between the ends of said first and said second drill pipes to be coupled for sealing said first drill pipe to said second drill pipe.

17. The coupler of claim 12 further including a plurality of male and female mating elements on the respective ends of said first and second drill pipes for drivingly connecting said first drill pipe to said second drill pipe, said mating elements being nonengaging with said interengaging means.

18. The coupler of claim 17 wherein said female mating elements comprise a continuous cylindrical rim with areas recessed radially in said rim, and said male mating elements comprise index lugs of a given width matable within said recessed areas.

19. The coupler of claim 17 further including a continuous cylindrical rim with a recess of a given arcuate length recessed radially therein on the inside of said rim, said female mating elements comprise other areas of arcuate lengths different from that of said interengaging means, and said male mating elements comprise drive lugs each with different shapes from that of said interengaging means.

20. A drill pipe for use in well drilling operations and adapted for carrying fluids and electrical signals, comprising:

a drill pipe having opposing ends with a concentric inner and outer side wall, said inner side wall defining a central conduit through which fluids are carried;

a plurality of individual elongate conduits extending axially through said drill pipe substantially from one end to the other end of said drill pipe, each said conduit being located between said inner and outer sidewalls and equidistantly spaced around said central conduit;

an electrical connector with an electrical contact fixed in each end of one conduit of said plurality, said one conduit defining an electrical conduit;

an electrical wire connecting the contact of one said connector to the contact of the other said connector;

a drive lug, and an index lug different from said drive lug, each integral with said drill pipe and extending axially beyond one said end;

a drive recess, and an index recess different from said drive recess, each recessed inwardly in the other end of said drill pipe;

a set of external threads around each end of said drill pipe, one set thereof having a different number of threads per inch than the other said set;

an internally threaded collar rotatable and disposed on one end of said drill pipe, said collar having a first set of internal threads engagable with said one set of pipe external threads, and a second set of internal threads corresponding to said other set of external threads of said drill pipe;

a rigid planar plate having a cross-sectional shape substantially the same as the cross-sectional shape of that part of said drill pipe which peripherally surrounds said plurality of conduits and said central conduit, a groove in each face surface of said plate surrounding voids therein corresponding to openings of said conduits; and an elastomeric gasket shaped to fit into each said groove, whereby when said drill pipe and said other similar drill pipe are compressively coupled together the pressure integrity of said plurality of conduits and said central conduit is maintained between said drill pipes.

* * * * *